United States Patent
Arachequesne

(10) Patent No.: US 9,080,839 B2
(45) Date of Patent: Jul. 14, 2015

(54) FIREARM WITH A TELESCOPIC SIGHT MOUNTED THEREON

(71) Applicant: SARL PATRICK ARACHEQUESNE, Miserey (FR)

(72) Inventor: Patrick Arachequesne, Miserey (FR)

(73) Assignee: SARL PATRICK ARACHEQUESNE, Miserey (FR)

(*) Notice: Subject to any disclaimer, the term of this patent is extended or adjusted under 35 U.S.C. 154(b) by 0 days.

(21) Appl. No.: 14/080,905

(22) Filed: Nov. 15, 2013

(65) Prior Publication Data

US 2014/0230306 A1 Aug. 21, 2014

(30) Foreign Application Priority Data

Feb. 18, 2013 (FR) ...................................... 13 00349

(51) Int. Cl.
| | |
|---|---|
| *F41C 27/00* | (2006.01) |
| *F41G 1/387* | (2006.01) |
| *F41G 11/00* | (2006.01) |
| *F41G 1/38* | (2006.01) |
| *G03B 29/00* | (2006.01) |

(52) U.S. Cl.
CPC *F41G 1/387* (2013.01); *F41G 1/38* (2013.01); *F41G 11/00* (2013.01); *G03B 29/00* (2013.01)

(58) Field of Classification Search
CPC ......... F41C 27/00; F41G 11/003; F41G 3/06; F41G 3/165; F41G 1/387; F41G 1/38
USPC ............. 42/119, 90, 111, 123, 124, 129, 131, 42/141, 106; 396/420, 426, 428
See application file for complete search history.

(56) References Cited

U.S. PATENT DOCUMENTS 3,911,451 A * 10/1975 Vockenhuber ................. 396/426
4,309,095 A * 1/1982 Buckley .......................... 396/420

(Continued)

OTHER PUBLICATIONS https://web.archive.org/web/20121120120729/https://www.volquartsen.com/products/382-thread-adapter, Nov. 20, 2012.*

(Continued)

*Primary Examiner* — Samir Abdosh
*Assistant Examiner* — John D Cooper
(74) *Attorney, Agent, or Firm* — Renner, Kenner, Greive, Bobak, Taylor & Weber

(57) ABSTRACT

Assembly forming a firearm comprising a firearm, in particular a hunting gun, comprising means for the attachment of a telescopic sight, and a telescopic sight fixed onto the weapon by fixing means, the sight comprising at least one turret, the at least one turret comprising a screw thread or a tapping, characterized in that an intermediate part is provided comprising on the one hand a tapping or screw thread corresponding to said screw thread or tapping of the at least one turret and on the other hand a threaded pin projecting from a face, preferably a planar face, for fixing to the intermediate part, by the threaded pin either directly a miniature camera comprising a corresponding tapped hole or a device which can be connected securely to the photographic device, in particular the miniature camera or the mobile phone provided with photographic functions, to enable the attachment to the intermediate part of said photographic device, and in particular the camera, for example the miniature camera or the mobile phone, whereas the intermediate part by means of its screw thread or tapping is screwed onto said at least one turret.

10 Claims, 5 Drawing Sheets

(56) References Cited

U.S. PATENT DOCUMENTS

| | | | |
|---|---|---|---|
| 5,020,262 A * | 6/1991 | Pena | 42/106 |
| 5,887,375 A * | 3/1999 | Watson | 42/106 |
| 7,614,805 B2 * | 11/2009 | Showalter | 396/428 |
| D683,809 S * | 6/2013 | Kasanjian-King | D22/108 |
| 2006/0288627 A1 * | 12/2006 | Liang | 42/123 |
| 2010/0071247 A1 * | 3/2010 | Holmberg | 42/124 |

OTHER PUBLICATIONS https://web.archive.org/web/20121130012929/http://springlock.us/shop/index.php?main_page=product_info&products_id=68, Nov. 30, 2012.*

* cited by examiner

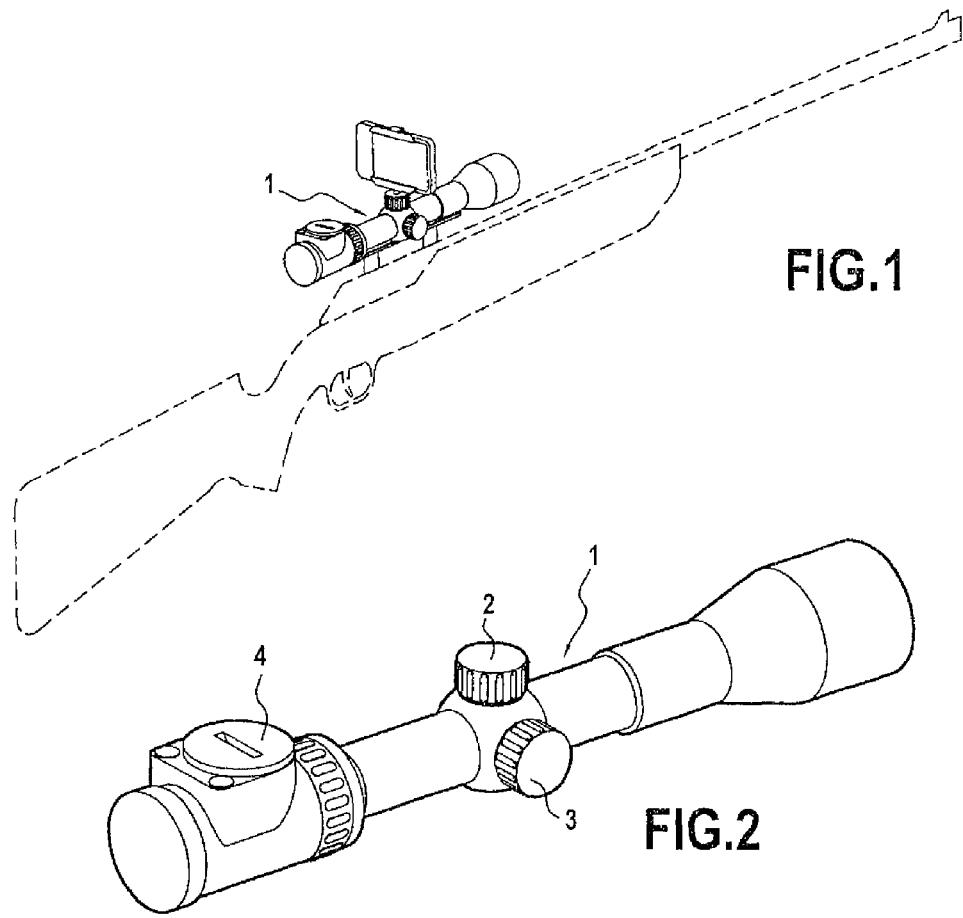
FIG.1
FIG.2
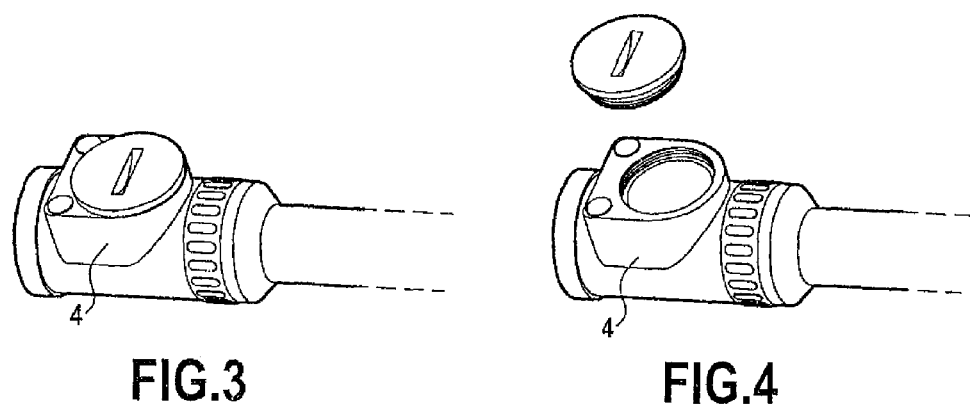
FIG.3     FIG.4

FIREARM WITH A TELESCOPIC SIGHT MOUNTED THEREON

The present invention relates to a firearm, in particular a shotgun or a hunting rifle or a handgun, on which a telescopic sight is mounted.

Users of firearms, in particular hunters, the military or law enforcement agencies, increasingly wish to film their activity by means of a portable camera or mobile phone. The act of fixing a miniature portable camera or mobile phone to a firearm, such as a hunting gun, by means of an intermediate part is already known. However, these systems do not guarantee the secure attachment of the miniature camera or mobile phone. In particular, the camera or mobile phone has the tendency to become dislodged from its support during firing, which generates a very high level of force affecting the quality of the photograph. Furthermore, these systems do not ensure the good equilibrium of the rifle for firing.

The aim of the present invention is to overcome the disadvantages of the prior art by proposing an assembly forming the firearm, in particular a hunting gun, on which it is possible to mount in a particularly stable manner a miniature camera or mobile phone with photographic functions without affecting the equilibrium of the gun, particularly during firing.

According to the invention, an assembly forming a firearm is as defined in claim 1, further refinements being defined in the subclaims.

Preferably, the screw thread or tapping is located at one end of the intermediate part and the threaded pin projects from a face, preferably a planar face, at the end opposite said end.

Preferably, the intermediate part is made from a rigid material, in particular a metal material made for example of aluminium or steel.

The present invention also relates to an assembly forming a sight designed to be fixed to a firearm and comprising a sight and an intermediate part according to the invention.

The present invention also relates to an intermediate part designed to be fixed to a shooting sight mounted on a firearm to enable the securing of a photographic device, such as a camera, in particular a miniature camera or a mobile phone with a photographic function.

By way of example an embodiment of the invention is described in the following with reference to the drawings, in which:

FIG. 1 is an overall view of an assembly forming a firearm according to the invention, comprising a firearm on which an sight is mounted onto which a photographic device is mounted in the form of a mobile phone;

FIG. 2 is a perspective view of a telescopic sight designed to be mounted on the firearm as shown in FIG. 1;

FIG. 3 shows in more detail a part of the sight of FIG. 2;

FIG. 4 shows the part of the sight of FIG. 3 in which the protective cap of the cell turret has been removed;

FIG. 1 shows an assembly according to the invention. The firearm is in the form of a hunting rifle on which a sight 1 is mounted having an inlet opening designed to be located close to the eye of the gunman, in particular substantially at the level of the trigger, and an outlet opening being located opposite the inlet opening, the sight extending substantially along the hunting gun in the direction of firing in the direction of the barrel of the gun. Said sight is mounted on the gun by means known from the prior art, in particular by sliding and/or dovetail systems.

Three turrets 2, 3 and 4 project from the substantially cylindrical outer casing of the sight. The turrets 2 and 3 are adjusting turrets comprising thumb-wheels for adjusting the relative position and relative inclination respectively of the sight in relation to the gun. With regard to turret 4, the latter comprises the cell enabling the functioning of the sight. Said three turrets are closed by screw caps.

With regard to the turrets comprising adjusting thumb-wheels, the latter have external threads and the caps onto which they are screwed comprise respective tappings, whereas the turret 4 comprising a cavity into which the cell is inserted comprises an inner tapping at the level of its free edge, by means of which a cap with an external thread is screwed on.

According to a first aspect of the invention, at least one of the caps is replaced by an intermediate part which enables a photographic device to be attached, in particular a camera, for example a miniature camera, or a mobile phone device having a photographic function such as video and/or photography in a very simple manner.

The intermediate part can, according to two embodiments of the invention shown respectively in FIGS. 5 and 6 and 7 and 8, have two forms in which it comprises a screw thread or a tapping designed respectively to cooperate with an adjusting turret 2 or 3 or a turret 4 for receiving a cell.

Figures 7, 8:
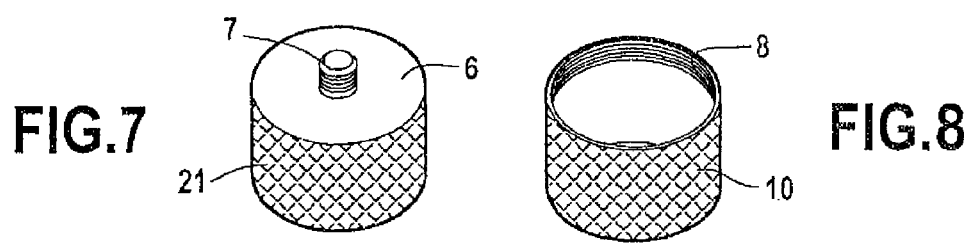
FIG. 7 is a perspective view from above of another embodiment of an intermediate part according to the invention.
FIG. 8 is a perspective view from below of the intermediate part of FIG. 7.

The intermediate part 10 shown in FIGS. 7 and 8 is designed to screw onto an adjusting turret, in particular the turret which extends in vertical direction. It is formed by a hollow circular cylinder open on one side and closed on the other by an upper planar face 6 from which a threaded pin 7 projects centrally. The opening which is located on the opposite side to the threaded pin comprises on the inner wall a tapping 8 corresponding to the screw thread of the adjusting turret 2 or 3.

Figure 9:
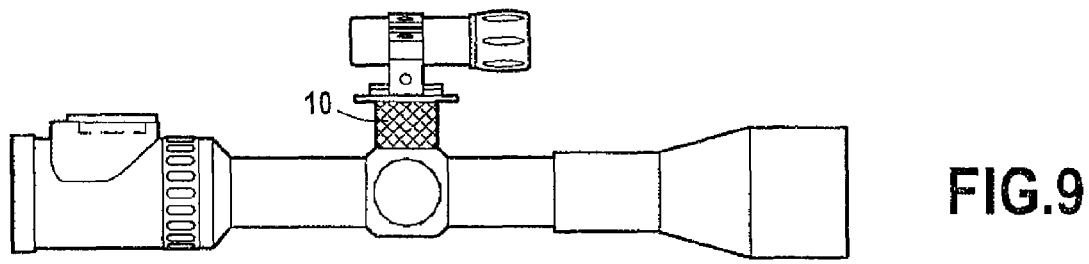
FIG. 9 is a perspective view of a sight on which a miniature camera is mounted by means of an intermediate part according to FIG. 7 or 8.

Thus, as shown in FIG. 9 (and also in FIG. 1), it is possible to screw the intermediate part 10 onto the turret, so as to provide a planar face (the upper face 6 from which the pin projects) and a threaded pin 7 which enables the very simple securing of the photographic device having a corresponding tapped hole. In this way the system as shown in FIG. 1 is obtained.

Figures 5, 6:
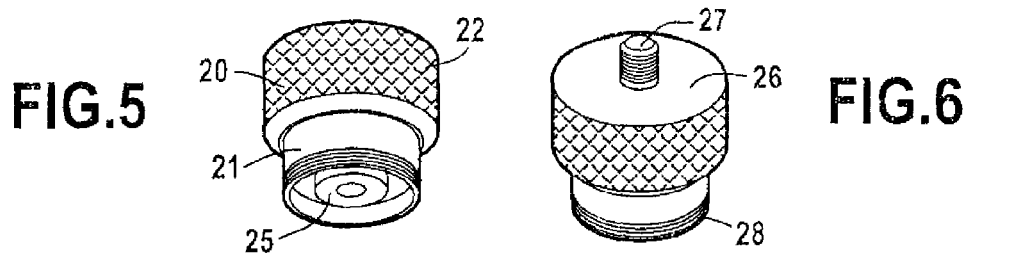
FIG. 5 is a perspective view from below of an intermediate part according to the invention.
FIG. 6 is a perspective view from above of the intermediate part of FIG. 5.

According to another embodiment shown in FIG. 5 or 6, the intermediate part 20 is formed by a circular cylinder in two sections, a lower section 21 with a small diameter and an upper section 22 with a larger diameter, the lower section with a small diameter having on its lower edge an external thread 28 whereas a threaded pin 27 projects from an upper planar face 26 of the upper section for securing the photographic device.

Figure 10:
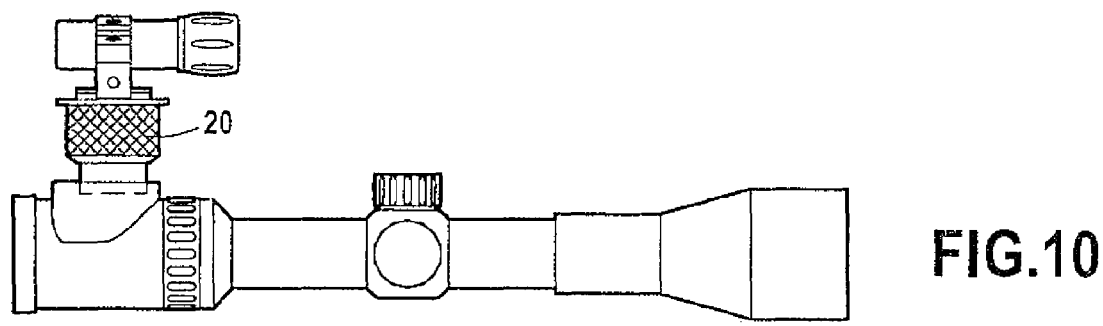
FIG. 10 is a view of a sight on which a miniature camera is mounted by means of an intermediate part according to FIG. 5 or 6.
Figure 11:
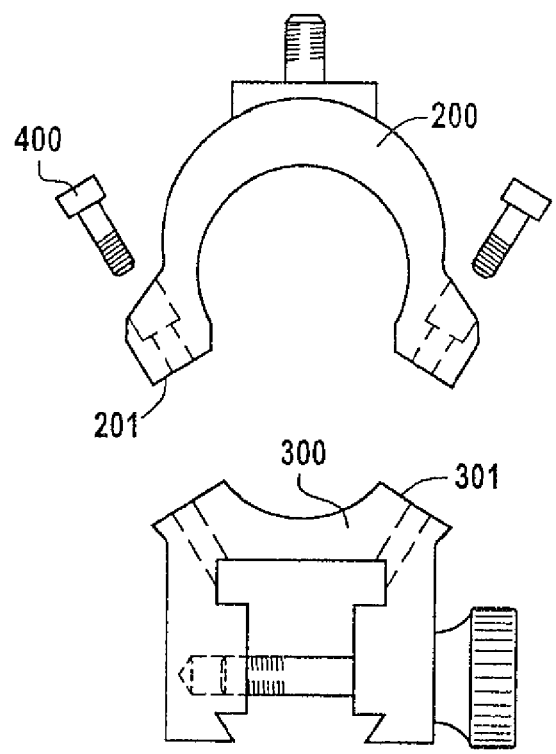
FIG. 11 is an exploded view of the different components of an intermediate fixing part designed to fix the photographic device of a firearm according to yet another embodiment of the invention.
Figure 12:
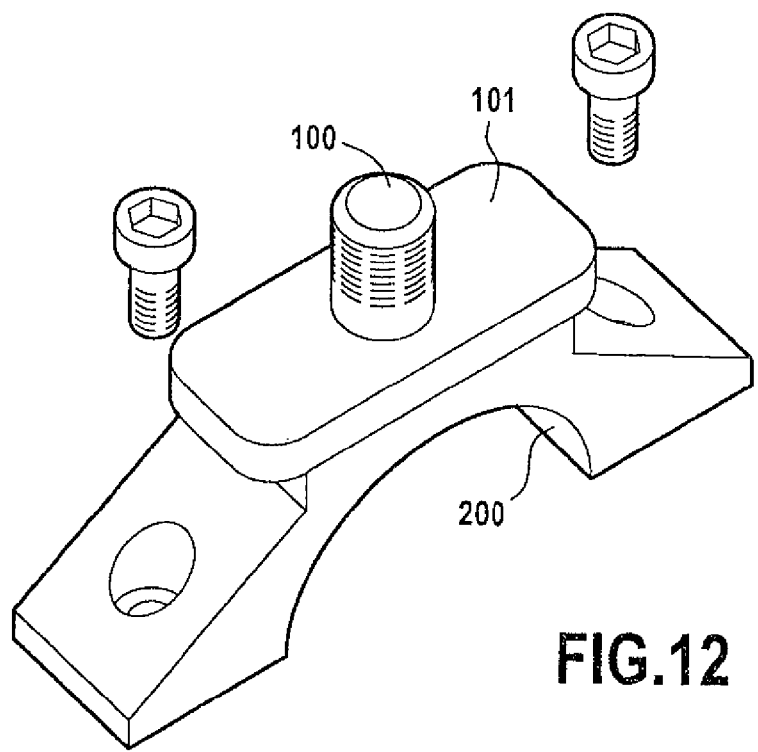
FIG. 12 is a perspective view of the upper part in the form of an inverted U of the part shown in FIG. 11.

In this second embodiment, the intermediate part is screwed to the tapping of the receiving turret of the cell of the electronic sight, as shown in FIG. 10. Preferably, in the inner cavity of the intermediate part 20, a pressure seal 25 is arranged which is designed to press on the cell to hold it in place and avoid the accidental detachment of the cell.

FIGS. 11 to 14 show another aspect of the invention.

Figure 14:
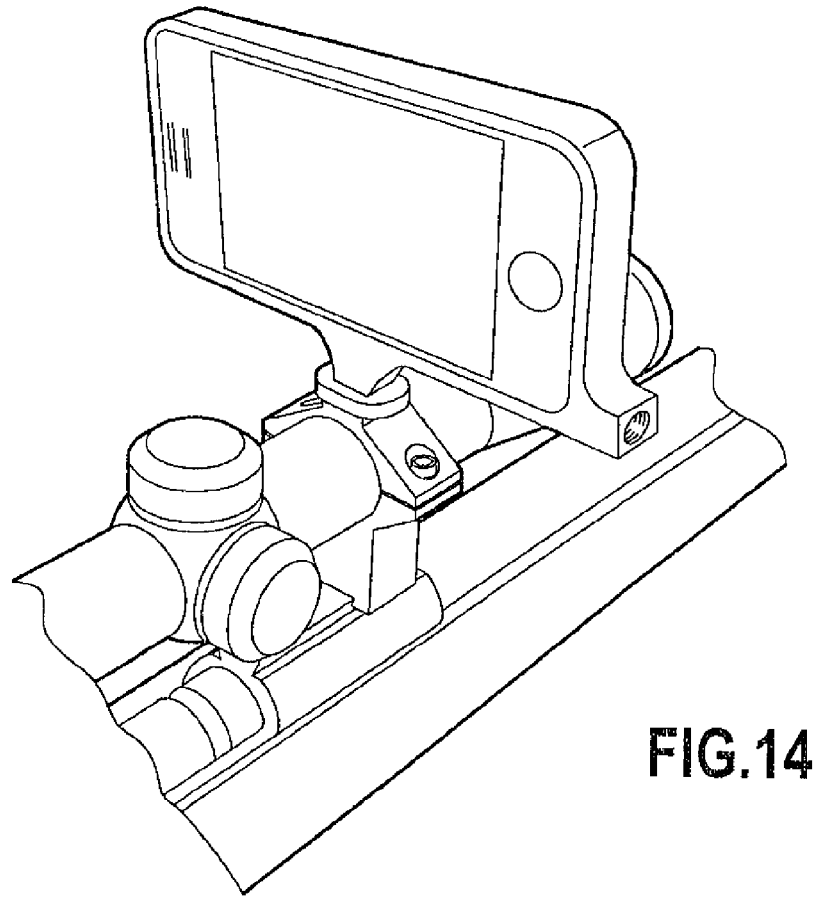
FIG. 14 is a perspective view of the firearm of FIG. 13 on which a photography device in the form of mobile phone with a photographic function has been mounted.

As shown in FIG. 14, the photographic device, here a mobile phone such as a "smartphone" with a photographic function, is mounted on the sight with its mechanical centre of gravity in the plane defined by axis of the sight and the axis of the gun barrel (which are parallel). This plane is the vertical plane during the normal use of the gun. This is also a plane of symmetry of the gun, of the sight and the assembly of the gun and the sight.

The assembly on the sight is performed by screwing a tapped hole formed in the mobile phone onto a threaded pin 100 which projects from the top of the sight.

Figure 13:
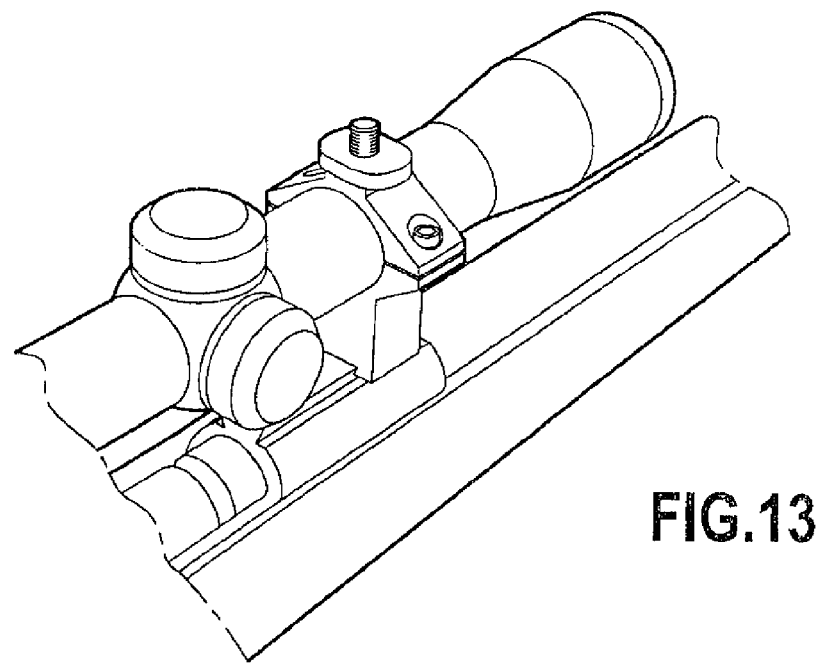
FIG. 13 is a perspective view of a firearm on which the intermediate fixing part of FIG. 12 has been mounted.

In this embodiment and as shown in FIG. 13, the pin 100 does not originate from one of the turrets of the screw device in the form of a sight, but from a part 200 in the form of an inverted U shown in FIG. 14. The securing of part 200 in the form of an inverted U which supports the threaded pin 100 is performed by means of a lower part 300 or base part which is arranged between the sight and the gun barrel in the manner of a wedge. Said lower part 300 comprises an upper part with a recessed concave shape towards the top and substantially matching the curved shape of the sight. Said part 300 is inserted between the sight and the gun barrel by tightening adjustment. In the upper part of part 300 holes 301 are formed (not visible in the figures) designed to cooperate with holes 201 of the upper part 200 in the form of a U for respective screwing by screws 400. On the upper part of the upper part 200 in the form of an inverted U, a flat part 101 is formed forming a substantially planar upper surface from which the threaded pin 100 projects. By screwing the screws 400 into the traversing holes 201 and into holes 301, the upper part 200 in the form of an inverted U is fixed to the base part 300 forming a wedge and thus the appropriate fixing is ensured of the threaded pin 100 above the sight, in order in this way to ensure the appropriate fixing of the mobile phone of the "smartphone" type with a photographic function as shown in FIG. 14.

Figure 15:
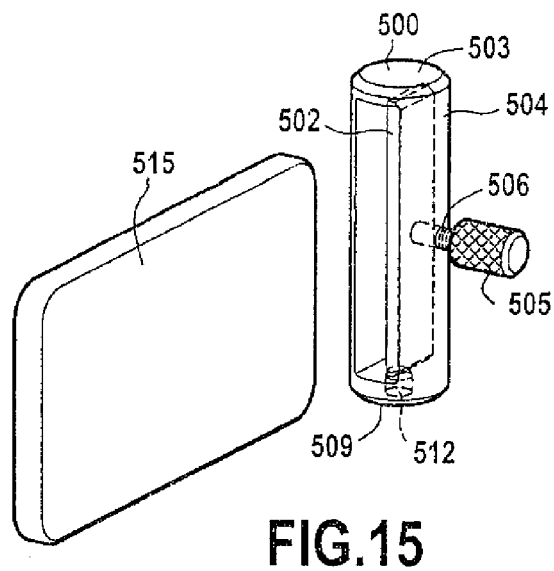
FIG. 15 is a perspective view of an attachment and a "smartphone" type mobile phone, showing only the outer shell.
Figure 16A:
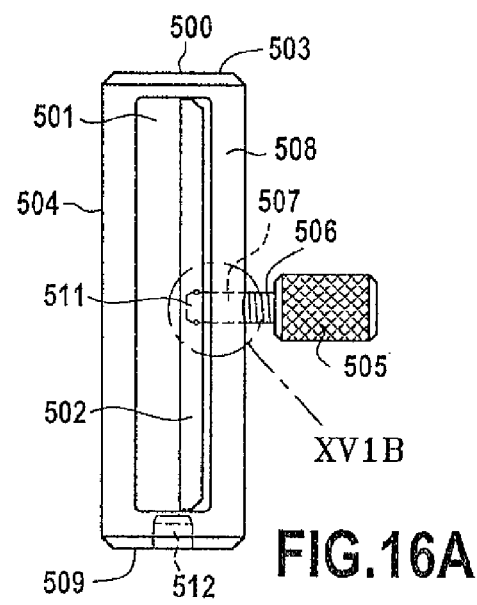
FIG. 16A is a side view of the attachment of FIG. 15.

FIG. 15 shows an attachment 500, which can be used with the two aspects of the invention described above, according to the invention and a mobile phone 515, of which only the shell is shown to simplify the illustration. The attachment 500 is made from a metal material but can also be made from another material, for example from polymers such as polycarbonates or the like by moulding, and has a substantially circular cylindrical form according to a vertical axis (axis from the bottom to the top in FIG. 2) and is traversed from one side to the other in transverse direction (perpendicular to the plane of FIG. 2) by a slot 501 having a substantially rectangular cross section. The respective dimensions of the slot 501 and of the smartphone 515 are such that the smartphone can be inserted into the slot 501 to traverse the attachment 500 from one side to the other by being inserted in transverse direction, i.e. also in the direction of the greatest length of the smartphone.

The slot 501 is delimited by two lateral walls 504 and 508 facing one another and two walls at the bottom and the top 509 and 503 respectively. In the slot 501, a plate 502 is mounted with a substantially rectangular shape which extends from one side to another in transverse direction along the length of the slot, preferably without projecting over either side of the attachment 500, and which also extends in the direction of height of the inner face of the wall 509 up to the inner face of the upper wall 503. Said substantially rectangular plate 502 is mounted in such a way as to be able to slide inside the slot 501 between a position in which the plate 502 is located substantially flush or in contact with the inner face of the wall 508 up to a position in which the plate 502 is flush or in contact with the inner face of the wall 504.

The sliding of the plate 502 is controlled by a thumb-wheel 505 comprising a threaded rod 506 and terminated by an unthreaded end part 511. The unthreaded end 511 of the rod 506 of the screw 505 is received in an opening 520 formed in the plate by being mounted in the manner of a trunnion, in particular by means of a toric ring cooperating with a groove formed on the periphery of the end part 511 of the rod. In the wall 508 a traversing tapped hole 507 is formed, the tappings of which correspond to the threads of the rod 506. In this way by screwing the screw it is possible to move the plate 502 between its two end positions. In fact, the cooperation of the thread of the rod 506 with the tapping of the threaded hole 507 moves the screw inside, which pushes the plate 502 in the same direction, the end of the rod 511 turning to trunnion in the opening 520 in which it is received.

Figure 17:
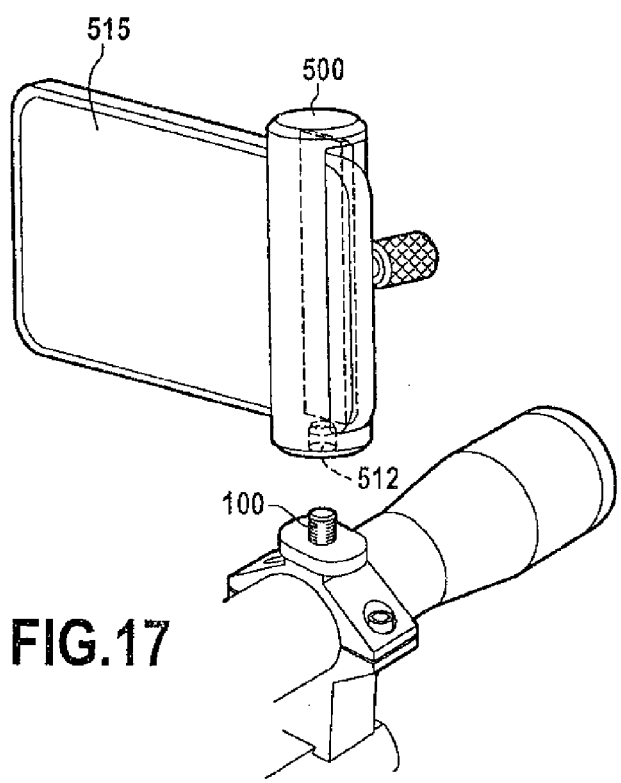
FIG. 17 is a perspective view of the attachment and mobile phone of FIG. 15 fixed to one another for fixing the mobile phone to the sight of the hunting gun of FIG. 13.
Figure 16B:
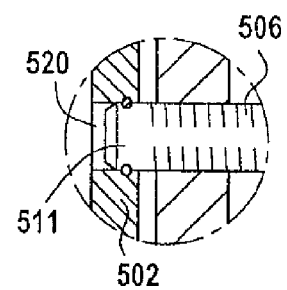
FIG. 16B is an enlarged view on a larger scale and in cross section of the circled part of FIG. 16A.

In the bottom wall 509 a blind tapped hole 512 is formed enabling the securing of the attachment to another object, for example enabling the securing of the attachment 500 to the sight of the hunting gun of FIG. 13, as shown in FIG. 17, by screwing into the threaded pin (reference number 100 in FIG. 12, or 7 in FIG. 7 or 27 in FIG. 6) projecting from the sight, and by clamping the plate, such that it forms a sandwich by locking the phone 515 between the plate 510 and the inner face of the wall 504. It also ensures the locking of the rectangular parallelepiped smartphone relative to the sight of the hunting gun and therefore relative to the hunting gun.

Furthermore preferably, the face of the plate 502 designed to come into contact with the shell 515 of the mobile phone is covered with a material for damping vibrations, for example an elastomer material or a felt or textile material or the like. It is also possible, instead of this or in addition, to cover the inner face of the side wall 504 with a material of the same type. In FIG. 17, the attachment is shown tightening the shell of the phone 515 substantially at its edge. Of course, it is also possible for the phone to be inserted into the attachment such that the latter clamps the phone in the middle, the gun assembly, sight, intermediate part, attachment and phone being then arranged symmetrically in relation to the longitudinal axis of the gun.

The invention claimed is:

1. A firearm assembly comprising a firearm, a telescopic sight fixated on said firearm and a filming device for filming fixated on said telescopic sight, said telescopic sight comprising at least one turret projecting from said telescopic sight and comprising a first thread, wherein said assembly comprises an intermediate part comprising a second thread and an outer threaded pin projecting from said intermediate part, wherein said intermediate part is disposed between said turret and said filming device, so that said first thread is screwed with said second thread and said outer threaded pin is screwed in a tapped hole securely connected to said filming device.

2. The firearm assembly of claim 1, wherein said first thread is an outer thread and said second thread is an inner thread.

3. The firearm assembly of claim 2, wherein said intermediate part is formed of a hollow circular cylinder open on one side and closed on an opposite side by a planar upper face from which said outer threaded pin projects centrally, said opening comprising on an inner wall thereof said second inner thread.

4. The firearm assembly of claim 1, wherein said first thread is an inner thread and said second thread is an outer thread.

5. The firearm assembly of claim 4, wherein said intermediate part comprises two circular cylindrical sections in succession, one with a larger diameter than the other, said cylindrical section with the smaller diameter comprising said outer second thread at an end thereof while said outer threaded pin is projecting from an upper surface of said larger diameter cylinder.

6. The firearm assembly of claim 5, wherein said intermediate part comprises inside said small diameter cylinder a seal made of a substantially flexible material to ensure by pressure the retention of a cell located in said turret onto which said intermediate part is screwed via said second thread.

7. The firearm assembly of claim 1, wherein said turret extends vertically, said turret having an axis-crossing an axis of the telescopic so that the filming device is arranged symmetrical relative to a firing axis of the firearm, thus avoiding any imbalance which might affect the quality of the firing and its precision.

8. The firearm assembly of claim 1, wherein said intermediate part substantially has the form of a circular cylinder.

9. The firearm assembly of claim 1, wherein said second thread is located at one end of said intermediate part and said outer threaded pin projects from a planar face of said intermediate part, opposite from said one end.

10. The firearm assembly of claim 1, wherein said filming device is a mobile phone.

* * * * *